June 12, 1928.
M. DECHMANN
1,673,140
HEATING APPLIANCE
Filed Jan. 22, 1927
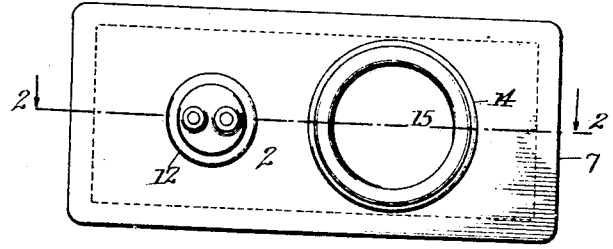
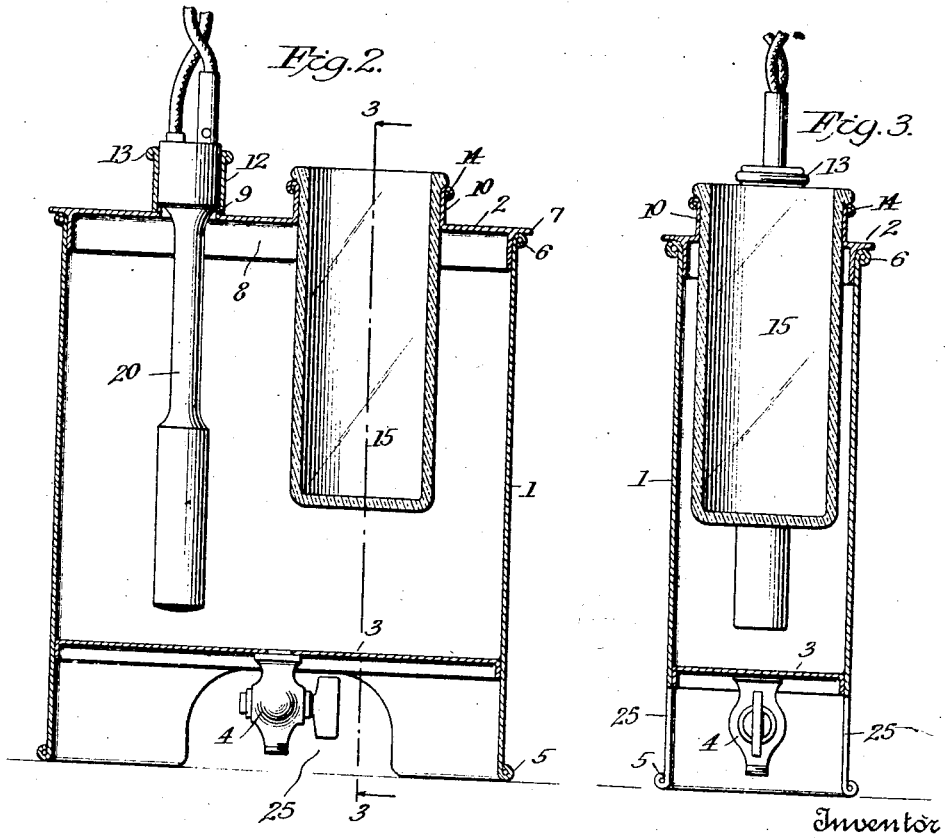
Inventor
Marie Dechmann Patented June 12, 1928.

1,673,140

UNITED STATES PATENT OFFICE.

MARIE DECHMANN, OF CHICAGO, ILLINOIS.

HEATING APPLIANCE.

Application filed January 22, 1927. Serial No. 162,869.

The present invention relates to improvements in heating appliances particularly of the character designed for use in households and has for its object to provide a very simple and inexpensive appliance which may be used with advantage in the preparation of foods for invalids or infants, or for heating liquid for any purpose.

By the invention, a readily portable container is provided with a removable cover having means for supporting a heating unit and also a receptacle for the food substance.

An embodiment of the invention is illustrated in the accompanying drawing, in which;

Figure 1 is a plan view.

Figure 2 is a vertical section substantially on the line 2—2 of Figure 1, and

Figure 3 a transverse vertical section substantially on the line 3—3 of Figure 2.

Referring to the drawing, in the several views of which like parts are designated by corresponding reference characters, 1 designates the body of a container which is provided with a suitable closure or cover 2. As shown, the bottom of the container 3 is elevated somewhat above the lower edges of the side walls and provided with an outlet controlled by a valve 4 by means of which liquid contents of the container may be withdrawn if desired.

As shown, the container is preferably made of sheet metal, the lower edges of the side walls being bent upon themselves to form a marginal bead or supporting edge 5. A similar bead 6 is formed about the upper end of the body of the container and on this rests the annular flange 7 of the cover 2. The cover is preferably provided with a depending flange 8 which closely contacts with the side walls of the body of the container and in said cover are formed two apertures surrounded by integral outward projecting bosses, 9, 10.

As shown, the aperture surrounded by the boss 9 is of less diameter than that surrounded by the boss 10 and a sleeve-like collar 12 is seated about the boss 9, the outer, upper, edge of which is formed with a marginal bead 13.

The outer end of the boss 10 is shaped to provide a bead 14 which as shown is adapted to support a receptacle 15 provided with an enlargement or bead at its upper open end.

As shown, the receptacle 15 is formed of glass or similar material and is particularly intended for use in heating milk or other liquid for invalids or infants. If desired, a nursing bottle may be positioned in said receptacle 15 or if preferred, such a container could be directly supported by the boss 10 on the cover, the receptacle 15 being removed.

20 illustrates, conventionally, an electric heater which is supported by the boss 9 within the sleeve-like collar 12, and by means of which the temperature within the container may be controlled as desired.

It will be seen that the bosses 9, 10 on the cover form a firm and stable support for rigidly holding the heater 20 and receptacle 15 in position within the body of the container and permit either said heater or receptacle to be easily detached and bodily withdrawn from the cover. The latter can also be removed from the container to permit access to the interior thereof for the purpose of cleaning the same, for example.

The body of the container is adapted to receive a body of liquid which may be heated by the heater 20 and withdrawn for use, as desired, through the outlet valve 4. For example, the outlet of the valve may be connected with a douche pipe, or the heated liquid can be withdrawn through such valve into any suitable vessel.

To permit ready access to the handle of the valve 4, and to permit the attachment of a discharge pipe to the outlet end of that valve, portions of the depending supporting skirt may be cut away as shown at 25.

The appliance is very compact and relatively small so that it can be easily moved without being provided with special handles, although such can be attached to the body of the container if desired.

It is believed that the object and advantages of the invention will be readily appreciated from the foregoing description in connection with the drawing.

It will be seen that the entire appliance is of very simple but durable construction so that it is not likely to be broken by being handled and all of the parts may be readily separated as desired.

Having thus described my invention, what I claim is:

1. In a heating appliance, the combination of a container, a cover therefor, a receptacle within said container supported by said cover, and heating means extending into said container and supported by said cover independently of the receptacle.

2. In a heating appliance, the combination of a container, a cover therefor having apertured bosses, a receptacle within said container supported by one of said bosses and, an electric heating element extending into said container supported by the other of said bosses.

3. A heating appliance comprising a substantially rectangular container having a bottom, side and end walls, said bottom wall removed from the base of said side and end walls, a cover for said container having upwardly extending apertured bosses, a receptacle suspended within said container supported by one of said bosses, an electric heating element extending within said container supported by the other said boss, and a drain valve for said container.

4. A heating appliance comprising a substantially rectangular container having bottom, side and end walls, said bottom wall arranged above the base of said side and end walls, a cover for said container having apertures therein each surrounded by an upwardly extending boss, a receptacle projecting through an aperture into said container supported by one of said bosses, an electric heating element extending into said container through another said aperture and supported by its surrounding boss, and a drain valve for said container secured to said bottom wall.

5. A heating appliance comprising a substantially rectangular container having bottom, side and end walls, said bottom wall arranged above the base of said side and end walls, a cover for said container having apertures therein each surrounded by an upwardly extending boss, a receptacle projecting through an aperture into said container supported by one of said bosses, an electric heating element extending into said container through another said aperture and supported by its surrounding boss, a drain valve for said container secured to said bottom wall and concealed by said side and end walls.

6. In a heating appliance, the combination with a container, a cover therefor, a receptacle within said container supported by said cover, and means extending into said container supported by said cover for directly heating said container contents and indirectly heating said receptacle contents.

7. A heating appliance comprising a casing having bottom and side walls, a cover for said casing, a receptacle open at the top supported by the cover and suspended therefrom within the casing, and a heating element adapted to be supported within the casing and bodily movable therefrom independently of said receptacle.

In testimony whereof I have hereunto set my hand.

MARIE DECHMANN.